(12) United States Patent
Powell et al.

(10) Patent No.: US 10,078,840 B2
(45) Date of Patent: Sep. 18, 2018

(54) METHOD FOR GENERATING AND UPDATING ALTERNATE SECURITY CODES FOR PAYMENT CARDS

(71) Applicant: MASTERCARD INTERNATIONAL INCORPORATED, Purchase, NY (US)

(72) Inventors: Michael Powell, Eureka, MO (US); Joan Rohlfing, Maryland Heights, MO (US); Alex Inovenkov, O'Fallon, MO (US); Rodney Pye, Riverwoods, IL (US); Puneet Bhalla, Lake St. Louis, MO (US); David Gilliland, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 374 days.

(21) Appl. No.: 14/681,165

(22) Filed: Apr. 8, 2015

(65) Prior Publication Data

US 2015/0310439 A1    Oct. 29, 2015

Related U.S. Application Data

(60) Provisional application No. 61/985,314, filed on Apr. 28, 2014.

(51) Int. Cl.
*G06K 5/00* (2006.01)
*G06Q 20/40* (2012.01)
*G06Q 20/38* (2012.01)
*G06Q 20/24* (2012.01)

(52) U.S. Cl.
CPC ........... *G06Q 20/409* (2013.01); *G06Q 20/24* (2013.01); *G06Q 20/3821* (2013.01); *G06Q 20/4018* (2013.01)

(58) Field of Classification Search
CPC .. G06Q 20/409; G06Q 20/4018; G06Q 20/24; G06Q 20/3821
USPC ......................................................... 235/380
See application file for complete search history.

(56) References Cited

U.S. PATENT DOCUMENTS

| | | | |
|---|---|---|---|
| 7,584,153 B2 | 9/2009 | Brown et al. | |
| 8,365,988 B1 | 2/2013 | Medina, III et al. | |
| 8,589,271 B2 | 11/2013 | Evans | |
| 2009/0173782 A1* | 7/2009 | Muscato | G06Q 20/10 235/379 |
| 2010/0237146 A1* | 9/2010 | Turner | G06Q 20/20 235/380 |
| 2010/0293093 A1 | 11/2010 | Karpenko | |
| 2012/0153028 A1* | 6/2012 | Poznansky | G06Q 20/385 235/492 |
| 2013/0054466 A1 | 2/2013 | Muscato | |
| 2013/0124292 A1* | 5/2013 | Juthani | G06F 21/41 705/14.26 |

(Continued)

*Primary Examiner* — Claude J Brown
(74) *Attorney, Agent, or Firm* — Seyfarth Shaw LLP; Brian Michealis

(57) ABSTRACT

An auxiliary security code called a CVC2a is generated to replace a CVC2 value that is presented on a payment card for verifying card-not-present (CNP) transactions without necessarily generating a replacement card. An enhanced card table/file is maintained by a payment network operator to facilitate transitional scenarios in which the payment cards are reissued or replaced.

20 Claims, 8 Drawing Sheets

(56) References Cited

U.S. PATENT DOCUMENTS

2013/0159188 A1    6/2013   Andon
2015/0371234 A1*  12/2015  Huang .................. G06Q 20/36
                                                            705/44

* cited by examiner

US 10,078,840 B2

METHOD FOR GENERATING AND UPDATING ALTERNATE SECURITY CODES FOR PAYMENT CARDS

CROSS REFERENCE TO RELATED APPLICATIONS

The present application claims the priority of U.S. Provisional Patent Application No. 61/985,314 filed on Apr. 28, 2014 and entitled "Method for Generating and Updating Alternate Security Codes for Payment Cards" which is incorporated by reference herein in its entirety.

FIELD OF TECHNOLOGY

The present disclosure relates generally to electronic commerce, and more particularly to payment cards for use with electronic payment systems.

BACKGROUND

The terms "card" and "payment card" are used herein to describe a payment card that can be presented by a cardholder to make a payment or that can be used to make a payment in a remote transaction, such as an e-commerce transaction, telephone transaction, or mail order for example. By way of example, and without limiting the generality of the foregoing, the cards described herein can be a credit card, debit card, charge card, stored-value card, or prepaid card. The remote transactions such as e-commerce transactions, telephone transactions and mail order transactions, in which the card is not presented directly to a merchant during the transaction, are referred to herein as card-not-present ("CNP") transactions.

Generally, payment cards have a "front" and a "back." In the case of a store card (also known as a private label or closed-loop card), the card front usually has the store name and/or logo and at least an account number and customer name, and the card back usually has at least a bar code or a magnetic stripe that contains account information. In the case of a general-purpose payment card (also known as an open-loop card), the card front generally has the payment brand, an issuer brand, an account number, cardholder name, expiration date, and certain security features (such as a hologram). The card back generally has at least a magnetic stripe and signature panel.

A magnetic stripe card is a type of card capable of storing data by modifying the magnetism of iron-based magnetic particles on a band of magnetic material on the card. The magnetic stripe, also referred to herein as a mag stripe, is read by physical contact and swiping past a reading head.

Counterfeiting of payment cards has been a major problem in markets using magnetic stripe static security code authentication to process card present transactions. In several markets around the world, the problem has been addressed by adopting Europay, MasterCard and Visa ("EMV") technology, which uses dynamic authentication. EMV technology is a global standard for inter-operation of chip cards.

Magnetic stripe cards are increasingly being replaced throughout the world by integrated circuit cards (IC cards or "chip cards") that include EMV technology. The expression "EMV card" is used herein to describe chip cards that include EMV technology. Because counterfeiting of chip cards is difficult or virtually impossible, it is expected that the problem of credit card counterfeiting and debit card counterfeiting will diminish significantly as the global use of magnetic strip cards diminishes. However, it is anticipated that card counterfeiting will be replaced by other types of fraud, such as fraudulent card-not-present ("CNP") transactions.

SUMMARY

Aspects of the present disclosure include a method for replacing a first imprinted security code of a first payment card without necessarily generating a replacement payment card. the method includes updating a payment card authentication database record associated with a first payment card number by including in the database record an indicator that a non-imprinted security code is in use for authorizing payments with the first payment card. The non-imprinted security code for the first payment card is generated by inputting the first payment card number of the first payment card, a first expiration date of the first payment card, and an auxiliary issuer code into an algorithm. According to an aspect of the present disclosure, the auxiliary issuer code is input to the algorithm in place of a primary issuer code that may otherwise be input to the algorithm to generate the first imprinted security code.

Another aspect of the present disclosure includes a system of machines configured for replacing a first imprinted security code of a first payment card without necessarily generating a replacement payment card when the first imprinted security code is compromised. The system includes a payment card data storage machine coupled in communication with a payment card network and a payment card processor coupled in communication with the payment card data storage machine. The payment card processor is configured to update a payment card authentication database record associated with a first payment card number on the payment card data storage machine by including in the database record an indicator that a non-imprinted security code is in use for authorizing payments with the first payment card. The payment card processor is further configured to generate the non-imprinted security code for the first payment card by inputting the first payment card number of the first payment card, a first expiration date of the first payment card, and an auxiliary issuer code into an algorithm. The auxiliary issuer code is input to the algorithm in place of a primary issuer code that may otherwise be input to the algorithm to generate the first imprinted security code.

Another aspect of the present disclosure includes a method for activating a payment card by determining whether a CVC2 code of a payment card has been compromised and in the event that the CVC2 code has been compromised, writing a new service code to a current/primary service code field in a payment card database and maintaining a previous/secondary service code field in the payment card database to zero. According to an aspect of the present disclosure, the method also includes generating a CVC2a code using the current service code that is stored in the current/primary service code field and activating the card for card-not-present (CNP) transactions with the CVC2a code.

Another aspect of the present disclosure includes a method for activating a payment card by generating an auxiliary CVC2 code called a CVC2a code for a corresponding payment card based on a service code and storing the service code in either a first service code field or a second service code field of a payment card authentication database to indicate that a CVC2a code is in use.

Another aspect of the present disclosure includes an apparatus for activating a payment card. The apparatus includes means for determining whether a CVC2 code of a payment card has been compromised and means for writing a new service code to a current/primary service code field of a payment card authorization database and setting a previous/secondary service code field of the payment card authorization database to zero in the event that the CVC2 code has been compromised. The apparatus also includes means for generating a CVC2a code using the current service code that is stored in the current/primary service code field of the payment card authentication database and means for activating the card for card-not-present (CNP) transactions with the CVC2a code.

BRIEF DESCRIPTION OF THE DRAWINGS

Embodiments of devices, systems, and methods are illustrated in the figures of the accompanying drawings which are meant to be exemplary and not limiting, in which like references are intended to refer to like or corresponding parts, and in which.

DETAILED DESCRIPTION

Figure 1:
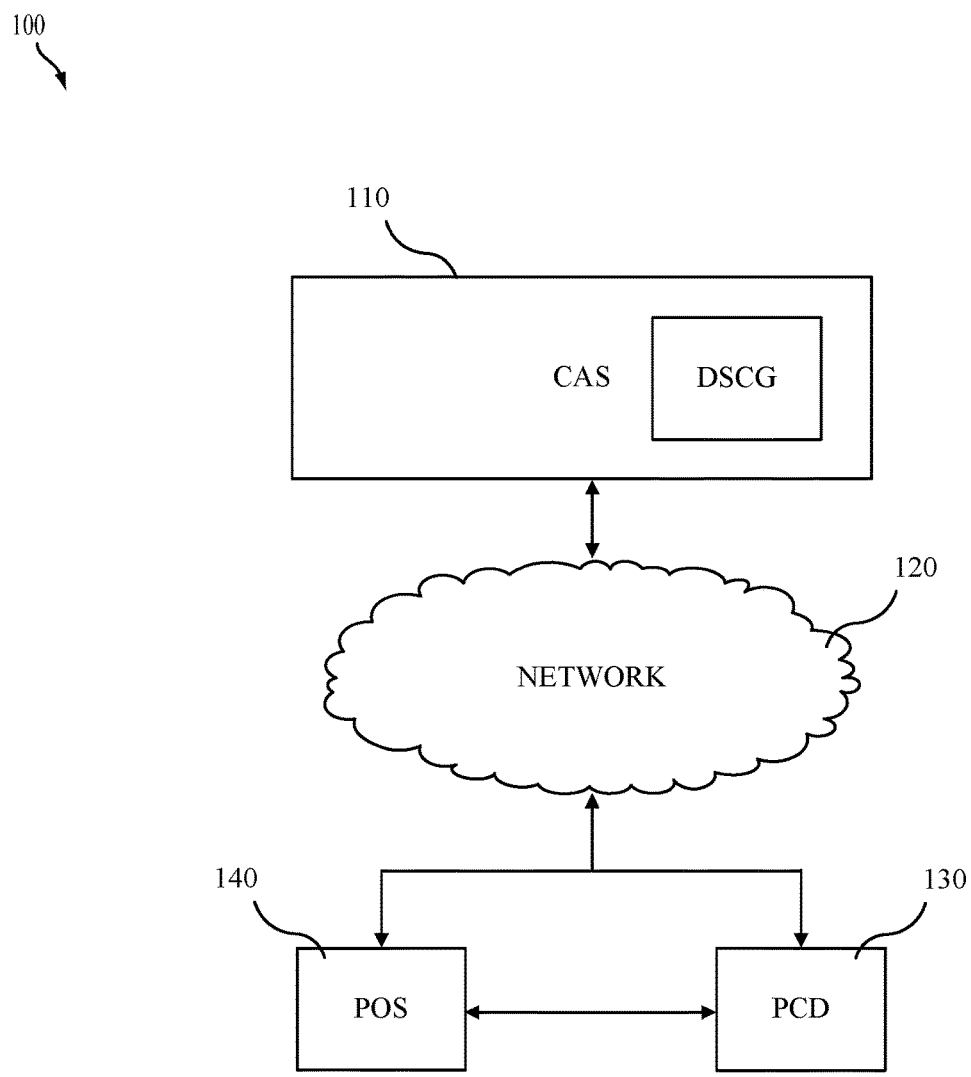
FIG. 1 is a conceptual system diagram illustrating a system for processing payments using a CVC2a system according to aspects of the present disclosure.

The detailed description of aspects of the present disclosure set forth herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, references to singular embodiment may include plural embodiments, and references to more than one component may include a singular embodiment.

As described herein, a card-not-present ("CNP") transaction is a transaction performed without presenting the card to a merchant. Common card not present transactions include e-commerce transactions, which are performed between remote parties over the Internet, mail order transactions and telephone order transactions, for example. CNP transactions are susceptible to fraud by unauthorized users who have accessed cardholder account information.

A Card Security Code (CSC), sometimes called Card Verification Value (CVV or CV2), Card Verification Value Code (CVVC), Card Verification Code (CVC), Verification Code (V-Code or V Code), or Card Code Verification (CCV) is a security feature for credit or debit card transactions, giving increased protection against credit card fraud. Several types of security codes have previously been implemented. A first type of code, called CVC1 or CVV1, is encoded on the magnetic stripe of the card and used for transactions in person. A second type of security code is the CVC2, sometimes called CVV2 or card identification number "CID." The CVC2 is commonly requested by merchants to secure CNP transactions.

The CVV2 is a 3-digit or 4-digit value printed on the card or signature strip, but not encoded on the magnetic stripe. MasterCard cards, Visa cards, Diners Club cards, Discover cards, and JCB cards (in each case, including credit and debit cards) have a 3-digit code, called the "CVC2" (card validation code), "CVV2" (card verification value), "CVV," and "CID" (card identification number), respectively. The CVV2 is typically not embossed like the card number, and is typically the final group of numbers printed on the back signature panel of the card. In some applications, the "CVC2" is in a separate panel to the right of the signature strip. This has been done to prevent overwriting of the numbers by signing the card. A CVC2 value is typically generated when the card is issued, by hashing the card number and expiration date under a key known only to the issuing bank. Presently, the CVC2 value is calculated by an algorithm based on three inputs, the card number and expiration date, which are embossed on the card, and a service code. The service code is a three digit code which by default is 000. Based on these three inputs and additional encryption keys, the algorithm calculates a CVC2 number that is then embossed on the card.

Presently, in order to complete a CNP transaction, a purchaser is asked to provide the card number, the card expiration date and the CVC2 value. Supplying the CVC2 value in a transaction is intended to verify that the customer has the card in their possession. Knowledge of the code proves that the customer has seen the card, or has seen a record made by somebody who saw the card.

Counterfeiting of payment cards is expected to decrease as preventative measures such as Europay, MasterCard and Visa ("EMV") technology is increasingly implemented. It is anticipated that fraudulent actors will increasingly attempt to commit CNP fraud by attempting to access the CVC2 values of credit cards along with the card numbers and expiration dates. Currently, after it has been determined that the CVC2 value of a card may have been accessed by an unauthorized party, a replacement card is typically reissued with a new card number and/or a new expiration date to prevent or curtail fraudulent transactions from being charged to the cardholder's account.

When credit cards and debit cards have been used in fraudulent transactions or when the security of cardholders' account information has been compromised, the cards are usually replaced at the expense of the card issuer. If a large number of cardholders are affected by a security breach, the cost of embossing and replacing the affected cards can be substantial. Moreover, because the cost of replacing a chip card is significantly greater than the cost of replacing a magnetic stripe card, the cost associated with issuing replacement cards has increased dramatically as the use of chip cards increases.

Aspects of the present disclosure include a method for creating and using an alternate CVC2 value (herein referred to as "CVC2a") that may be used with an existing card for valid future CNP transaction activity, without requiring the issuer to reissue another card. The method accommodate reissue processes for reissuing a card that is about to expire, card replacement processes for replacing cards such as damaged cards that have not been lost or compromised, and accelerated replacement processes for replacing compromised cards and/or providing a new CVC2a value to replace a compromised CVC2 value.

In cases of suspected fraud on an individual card, a cardholder will typically call the issuer to notify the issuer directly of the suspected fraud. According to aspects of the present disclosure, the issuer may then request to have a payment card network operator, such as MasterCard International Incorporated of Purchase, N.Y., U.S.A., assign a CVC2a value to the card rather than issue a replacement. In cases of mass fraud, the issuer may be notified of a large merchant data breach. According to aspects of the present disclosure, the issuer may request to have the payment card network operator assign CVC2a values en mass to a large number of cards. In one example, the issuer may use existing Single Batch File (SBF) maintenance processes to request creation of the CVC2a values for a large number of cards at one time. The SBF is a communication mechanism used by payment card network operators to implement a batch update of payment card accounts. In another example, a web service may be implemented that receives requests from an issuer to issue new CVC2a values, and automatically generates and activates the CVC2a values. The present disclosure describes a method for assigning the CVC2a values and making the CVC2a values available for use by a cardholder.

According to aspects of the present disclosure, when an issuer requests assignment of a CVC2a value or a batch of new CVC2a values, a new service code is input to the algorithm along with the card number and expiration date for each card to generate the respective CVC2a value for each card. The issuer may then communicate the CVC2a values to the respective cardholders. Cardholder can then use the CVC2a number with their existing card instead of the CVC2 that is displayed on the card to transact for card not present transactions. As soon as the CVC2a value is assigned, the old CVC2 number is restricted and will not be usable for CNP transactions.

According to an aspect of the present disclosure, the CVC2a value can be generated for immediate use by an individual cardholder. Alternatively, a batch of CVC2a values may be generated en mass and assigned for a number of card holders. When CVC2a values are generated, use of the corresponding cards may optionally be temporarily restricted until the CVC2a values are communicated to the respective cardholders. According to another aspect of the present disclosure, cards that have been given a restricted status may be used immediately for card-present transactions but not for CNP transactions, for example. CNP transactions may not be performed using the cards until the restricted status is removed, for example when the CVC2a value has been effectively communicated to the cardholder.

According to an aspect of the present disclosure, a process for authorizing use of a restricted card in a card-present transaction may be enhanced to verify the presence of the card and perform appropriate authorization steps. This may involve enhancements to conventional transaction processing systems such as the commonly used BASE 24 transaction processing system, for example.

According to an aspect of the present disclosure, the CVC2a values may be communicated to the respective cardholders by an enhanced interactive voice response (IVR) system. A traditional IVR system is an automated telephone system that allows a cardholder to activate their card by calling a toll free telephone number and responding to a number of voice prompts. According to aspects of the present disclosure, if the issuer decides to communicate the CVC2a value to a cardholder by mail, for example, the enhanced IVR system includes prompts that allow a user to confirm safe receipt of the CVC2a value. In response to the user confirming safe receipt of the CVC2a value, the enhanced IVR system automatically removes the restricted status of the respective card. According to aspects of the present disclosure, the IVR system may be enhanced to facilitate use by large numbers of credit card holders, when a large number of CVC2a values are assigned in response to a massive security breach, for example.

The method of assigning CVC2a values according to aspects of the present disclosure may be adaptively employed for many or all reissue situations. For example when a CVC2a value has been assigned to a card that is later replaced for damage without loss of the card or indicia of fraud, then the replacement card identical to the original card may be issued with the same card number and same expiration date as the card being replaced. The cardholder may use the replacement card along with the previously assigned CVC2a value to perform CNP transactions.

In other scenarios, in which a card is replaced or reissued and either the card number or expiration date has changed, the CVC2a value will only be valid on the original card. According to aspects of the present disclosure, the new card will be embossed with a different original CVC2 value.

The term "replacement" as used herein refers to the case in which neither the card number nor the expiration date being changed (if the card was damaged for example). According to aspects of the present disclosure, in the case of a replacement, there is no change to the new service code fields on the card table/file. The term "reissue" as used herein refers to the case where one or both of these fields changed. In the reissue case, the primary/current service code field is moved to the secondary/previous service code field and the primary/current service code field is reset to 000. Because either the card number and/or the expiration date has changed in the reissue case, the algorithm used to calculation the embossed CVC2 generates a new unique number.

In order to allow both an original card and a replacement or reissued cards to be active until the original card expires, two new fields are added to a card table and/or card file that is maintained by the payment card network operator. The card table or card file is a data structure that is used to store payment card information by the payment card network operator. Applications for interacting with the card table and/or card file may include the "CAMS" application and/or online communication interface applications, such as the "BASE24" application both of which are used by MasterCard International Incorporated of Purchase, N.Y. for maintaining card files/tables. According to aspects of the present disclosure the card file/table is enhanced to include the two new service code fields for implementing the CVC2a values. The two new fields are related to the CVC2a service code only and will function in the same way as the expiration date fields do today in the reissue process.

Table 1 below illustrates the values of the two new card table/file fields in several different scenarios. In the table, a Y in the column labeled "Replaced" indicates no change in either the card number or the expiration date. A Y in the column labeled "Reissued" indicates any other reissue scenario where either the card number or the expiration date has changed.

TABLE 1

| CVC2 Compromised | CVC2a Service Code (on card table/file) | | Replaced | Reissued |
|---|---|---|---|---|
| | Current/Primary | Previous/Secondary | | |
| N | 000 | 000 | N | N |
| Y | 001 | 000 | N | N |
| Y | 001 | 000 | Y | N |
| Y | 000 | 001 | N | Y |

Referring to Table 1, according to aspects of the present disclosure, in order to allow both an original card and a replacement or reissued card to be active until the original card expires, the codes stored in the two new service code fields may be used along with the expiration date and card number to compute CVC2 and CVC2a values.

When the CVC2a value is not enabled, both service code fields will contain a value of 000, which is the default code used today for CVC2. However, once created and enabled, the CVC2a primary/current service code field is populated with a non-zero three digit value. This non-zero three digit value is used to calculate the CVC2a value to be communicated to the cardholder. When a new card is issued and, either the card number or the expiration date has changed, the current CVC2a service code is moved to the secondary/previous service code field and 000 is placed into the primary/current service code field. This allows the original card (with the CVC2a enabled) to be used with the CVC2a value for CNP transactions and the newly issued card to be used (once activated) with the new 'original' CVC2 value embossed on the card. Once the original card expires, the card table (in CAMS) and the card file (in BASE24) is updated to move 000 to the secondary/previous CVC2a service code field.

According to aspects of the present disclosure, if the card has never been compromised, the value in both of the two service code fields will be zero which indicates that the CVC2 value displayed on the card is still valid. When a CVC2a value is assigned to a card, for example when the card has been compromised, the CVC2a service code is written to the first of the two service code fields. This field is called the current/primary service code field. To indicate the overlap period, e.g., when two cards having different expiration dates are both active, the current CVC2a service code is written to the second of the two service-code fields, called the previous/secondary service code field, and 000 is written to the current/primary service code field.

In another scenario, when a replacement card is issued without loss of the card or indicia of fraud, the card number and expiration date remain unchanged. The replacement card is embossed in the same way as the card being replaced and includes the same CVC2 value embossed on the back. According to aspects of the present disclosure, the two service code fields may also remain unchanged for a replacement card so the CVC2 value remains valid.

In one example, when a card that had been assigned a CVC2a value is about to naturally expire, the issuer will usually mail a new card to the cardholder. In this situation, the new card will have a new expiration date. Because the expiration date is one of the inputs to the algorithm described above, which calculates the CVC2 value, the algorithm described above will generate a new CVC2 value for the new card. According to aspects of the present disclosure the two cards may be simultaneously active because, the system is configured to allow the CVC2a service code (e.g. 001) to work with the old card until it expires and then the 000 code is assigned to the current/primary card. Since the new card has a new expiration date, a service code of 000 may be used to generate the CVC2 that is embossed on the card. Once the old card expires the current/primary field and the previous/secondary field are both set to zero.

According to aspects of the present disclosure, if the CVC2a becomes compromised, for example if the card has been compromised twice, another CVC2a value may be generated to replace the compromised CVC2a value. Because the three digit service code used to generate the CVC2a value is stored in the card table/file, up to 999 different CVC2a values may be generated for each card as long as the service codes that generated the compromised CVC2a values are stored or tracked to prevent reuse of the compromised CVC2a values. In an alternative embodiment, the three digit service code may simply be incremented by one or by another predetermined increment to prevent reuse of the compromised CVC2a values without necessarily storing or tracking previously used service codes.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

The phrases consumer, customer, user, account holder, card member or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the card member may include a transaction account owner, a transaction account user, an account affiliate, a child account user, a subsidiary account user, a beneficiary of an account, a custodian of an account, and/or any other person or entity affiliated or associated with a transaction account.

Systems, methods, and articles of manufacture capable of processing a transaction using a CVC2a code are disclosed herein. In various embodiments, an account authorization system may generate a plurality of dynamic security codes and store the plurality of dynamic security codes in a queue. In various embodiments, a portable consumer device may download a transaction application. The portable consumer device may download the plurality of dynamic security codes from the account authorization system. The portable consumer device may use the transaction application to generate a payment code comprising a transaction account number and a dynamic security code. A merchant may scan the payment code and transmit a transaction request to the account authorization system. The account authorization system may compare the transaction account number and the dynamic security code with information stored in a database. The account authorization system may transmit an authorization message to the merchant.

In various embodiments, the portable consumer device may scan a payment code and transmit a transaction request to the account authorization system. The account authorization system may initiate a communication session with a merchant point of sale device associated with the payment code. A consumer associated with the portable consumer device may input information such as a dynamic security code into the merchant point of sale device, and the merchant point of sale device may transmit the information to the account authorization system. The account authorization system may transmit an authorization message to the merchant point of sale device.

Referring to FIG. 1, a system 100 for processing payments using the CVC2a system described herein is illustrated according to various embodiments. System 100 may comprise a Card Authorization System ("CAS") 110, Network 120, a Portable Consumer Device ("PCD") 130, and a merchant Point of Sale device ("POS") 140. The various system components may communicate via network 120.

In various embodiments, CAS 110 (also known as an account authorization system) may be capable of or configured to perform all or part of an authorization process in relation to a payment transaction associated with a transaction account. CAS 110 may comprise any combination of hardware and software, such as servers, databases, firewalls, computers, etc., in order to authorize transactions. In various embodiments, CAS 110 may be operated by a payment processor (e.g., transaction account issuer).

Figure 2:
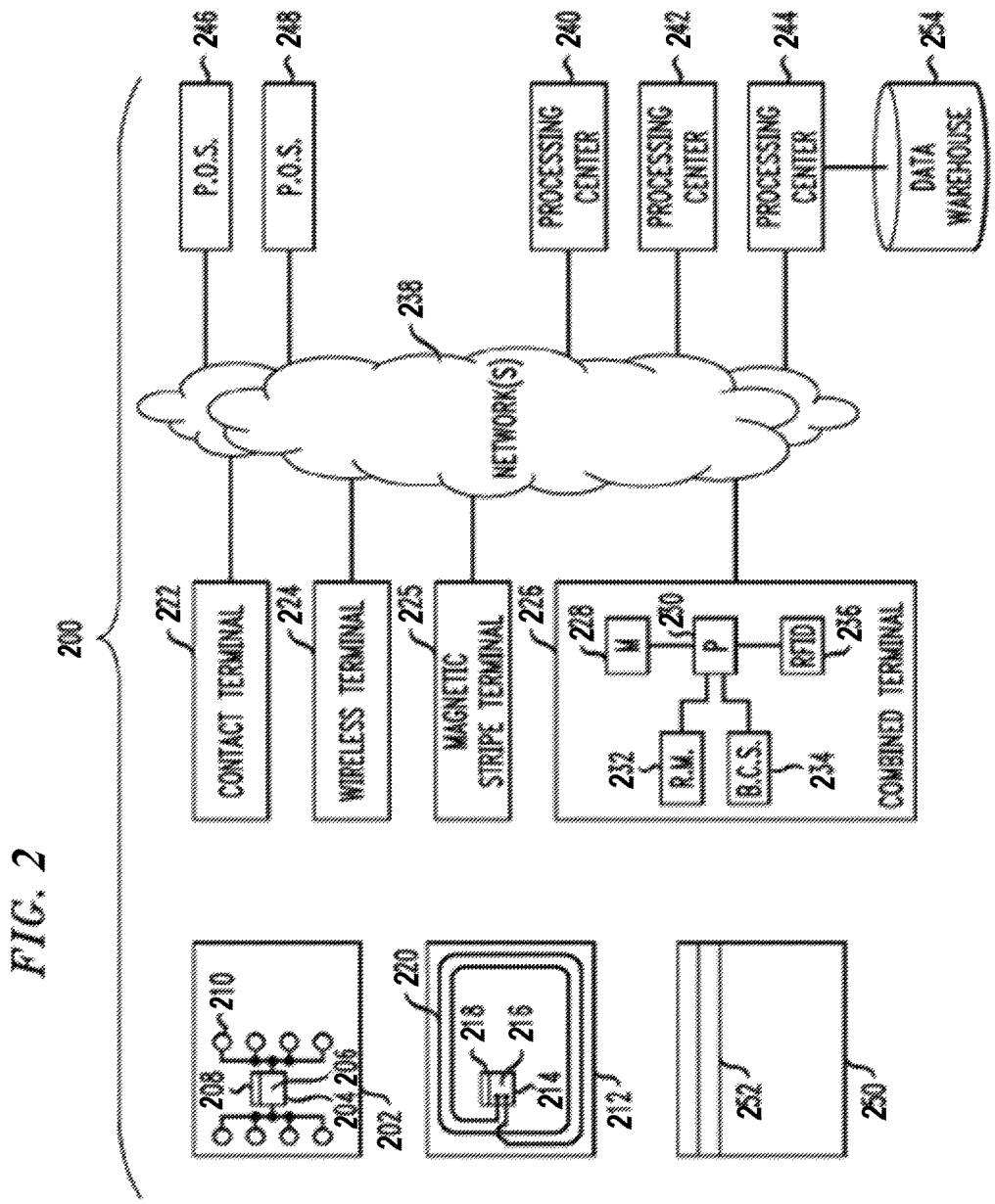
FIG. 2 is a system conceptual system diagram illustrating a system within which cards according to embodiments of the present disclosure could be used, and/or within which exemplary methods according to embodiments of the present disclosure could be carried out.

Attention should now be given to FIG. 2, which depicts a non-limiting example of a system 200, within which cards according to embodiments of the present disclosure could be used, and/or within which exemplary methods according to embodiments of the present disclosure could be carried out. Various possible components of the system are shown. System 200 can include one or more different types of portable payment devices. For example, one such device can be a contact device such as card 202. Card 202 can include an integrated circuit (IC) chip 204 having a processor portion 206 and a memory portion 208. A plurality of electrical contacts 210 can be provided for communication purposes. In addition to or instead of card 202, system 200 can also be designed to work with a contactless device such as card 212. Card 212 can include an IC chip 214 having a processor portion 216 and a memory portion 218. An antenna 220 can be provided for contactless communication, such as, for example, using radio frequency (RF) electromagnetic waves. An oscillator or oscillators, and/or additional appropriate circuitry for one or more of modulation, demodulation, down conversion, and the like can be provided. Other types of devices could include a card 250 having a magnetic stripe 252.

The ICs 204, 214 can contain processing units 206, 216 and memory units 208, 218. The ICs 204, 214 can also include one or more of control logic, a timer, and input/output ports. Such elements are well known in the IC art and are not separately illustrated. One or both of the ICs 204, 214 can also include a co-processor, again, well-known and not separately illustrated. The control logic can provide, in conjunction with processing units 206, 216, the control necessary to handle communications between memory unit 208, 218 and the input/output ports. The timer can provide a timing reference signal from processing units 206, 216 and the control logic. The co-processor could provide the ability to perform complex computations in real time, such as those required by cryptographic algorithms.

The memory portions or units 208, 218 may include different types of memory, such as volatile and non-volatile memory and read-only and programmable memory. The memory units can store transaction card data such as, e.g., a user's personal identification number ("PIN") and/or primary account number ("PAN"). The memory portions or units 208, 218 can store the operating system of the cards 202, 212. The operating system loads and executes applications and provides file management or other basic card services to the applications. One operating system that can be used is the MULTOS® operating system licensed by MAOSCO Limited. (MAOSCO Limited. St. Andrews House, The Links, Kelvin Close, Birchwood, Warrington, WA3 7PB. United Kingdom). Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 208, 218. Flash memory or other non-volatile and/or volatile types of memory may also be used in the memory units 208, 218.

In addition to the basic services provided by the operating system, memory portions 208, 218 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that, strictly speaking, the EMV specification defines the behavior of a terminal; however, the card can be configured to conform to such EMV-compliant terminal behavior and in this sense is itself EMV-compliant. It will be appreciated that applications can be configured in a variety of different ways.

As noted, cards 202, 212 are examples of a variety of payment devices. Devices could include cards having a conventional form factor, smaller or larger cards, cards of different shape, key fobs, and the like. The cards can include body portions (e.g., laminated plastic layers of a payment card, chip packaging, and the like), memories 208, 218 associated with the body portions, and processors 206, 216 associated with the body portions and coupled to the memories. The memories 208, 218 can contain appropriate applications. The processors 206, 216 can be operative to execute one or more method steps. The applications can be, for example, application identifiers (AIDs) linked to software code in the form of firmware plus data in a card memory such as an electrically erasable programmable read-only memory (EEPROM). Again, note that "smart" cards are not necessarily required and a conventional magnetic stripe card can be employed.

Note that it is presently prevalent to employ full-sized cards of a conventional form factor in order to have sufficient space to include the acceptance attributes on a single side.

Cards may conform to the ISO/IEC 7810 ID-1 format for example (also referred to as "full sized" or "conventional form factor").

A number of different types of terminals can be employed with system 200. Such terminals can include a contact terminal 222 configured to interface with contact-type device 202, a wireless terminal 224 configured to interface with wireless device 212, a magnetic stripe terminal 225 configured to interface with a magnetic stripe device 250, or a combined terminal 226. Combined terminal 226 is designed to interface with any type of device 202, 212, 250. Some terminals can be contact terminals with plug-in contactless readers. Combined terminal 226 can include a memory 228, a processor portion 230, a reader module 232, and optionally an item interface module such as a bar code scanner 234 and/or a radio frequency identification (RFID) tag reader 236. Items 228, 232, 234, 236 can be coupled to the processor 230. Note that the principles of construction of terminal 226 are applicable to other types of terminals and are described in detail for illustrative purposes. Reader module 232 can be configured for contact communication with card or device 202, contactless communication with card or device 212, reading of magnetic stripe 252, or a combination of any two or more of the foregoing (different types of readers can be provided to interact with different types of cards e.g., contacted, magnetic stripe, or contactless). Terminals 222, 224, 225, 226 can be connected to one or more processing centers 240, 242, 244 via a computer network 238. Network 238 could include, for example, the Internet, or a proprietary network. More than one network could be employed to connect different elements of the system. Processing centers 240, 242, 244 can include, for example, a host computer of an issuer of a payment device.

Many different retail or other establishments, represented by points-of-sale 246, 248, can be connected to network 238. In one or more instances, various establishments may interface with a telecommunications network, such as a virtual private network (VPN), via one or more machines which are then connected to the network. Each such establishment can have one or more terminals. Further, different types of portable payment devices, terminals, or other elements or components can combine or "mix and match" one or more features depicted on the exemplary devices in FIG. 3.

Portable payment devices can facilitate transactions by a user with a terminal, such as 222, 224, 225, 226, of a system such as system 200. Such a device can include a processor, for example, the processing units 206, 216 discussed above. The device can also include a memory, such as memory portions 208, 218 discussed above, that is coupled to the processor. Further, the device can include a communications module that is coupled to the processor and configured to interface with a terminal such as one of the terminals 222, 224, 225, 226. The communications module can include, for example, the contacts 210 or antennas 220 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" cards or mag stripe cards.

It will be appreciated that the terminals 222, 224, 225, 226 are examples of terminal apparatuses for interacting with a payment device of a holder. The apparatus can include a processor such as processor 230, a memory such as memory 228 that is coupled to the processor, and a communications module such as 232 that is coupled to the processor and configured to interface with the portable apparatuses. The processor 230 can be operable to communicate with portable payment devices of a user via the communications module 232. The terminal apparatuses can function via hardware techniques in processor 230, or by program instructions stored in memory 228. Such logic could optionally be provided from a central location such as processing center 240 over network 238. The aforementioned bar code scanner 234 and/or RFID tag reader 236 can be provided, and can be coupled to the processor, to gather attribute data, such as a product identification, from a UPC code or RFID tag on a product to be purchased.

The above-described devices 202, 212 can be ISO 7816-compliant contact cards or devices or NFC (Near Field Communications) or ISO 14443-compliant proximity cards or devices. In operation, card 212 can be touched or tapped on the terminal 224 or 228, which then contactlessly transmits the electronic data to the proximity IC chip in the card 212 or other wireless device.

One or more of the processing centers 240, 242, 244 can include a database such as a data warehouse 254.

Cards in accordance with embodiments of the present disclosure may be used within larger systems that can employ hardware and/or software aspects. Software includes but is not limited to firmware, resident software, microcode, etc. Software might be employed, for example, in connection with a terminal 222, 224, 225, 226; a processing center 240, 242, 244 (optionally with data warehouse 254) of a merchant, issuer, acquirer, processor, or operator of a network operating according to a payment system standard (and/or specification); and the like. Firmware might be employed, for example, in connection with payment devices such as cards 202, 212.

Thus, elements of a system can make use of computer technology with appropriate instructions to facilitate method steps. By way of further example, a terminal apparatus 222, 224, 225, 226 could include, inter alia, a communications module, an antenna coupled to the communications module, a memory, and at least one processor coupled to the memory and the communications module and operative to interrogate a contactless payment device (in lieu of the antenna and communications module, appropriate contacts and other elements could be provided to interrogate a contact payment device such as a contact card or read a magnetic stripe).

As used herein, the term "end user", "consumer", "customer", "card member", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure.

An electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

Each participant may be equipped with a computing device in order to interact with the system and facilitate online commerce transactions. The customer may have a computing unit in the form of a personal computer, although other types of computing units may be used including laptops, notebooks, hand held computers, set-top boxes, cellular telephones, touch-tone telephones and the like. The merchant may have a computing unit implemented in the form of a computer-server, although other implementations are contemplated by the system. The bank may have a computing center shown as a main frame computer. However, the bank computing center may be implemented in other forms, such as a mini-computer, a PC server, a network of computers located in the same or different geographic locations, or the like. Moreover, electronic commerce systems as described herein may facilitate the use, sale or distribution of any goods, services or information over any network having similar functionality described herein.

Figure 3:
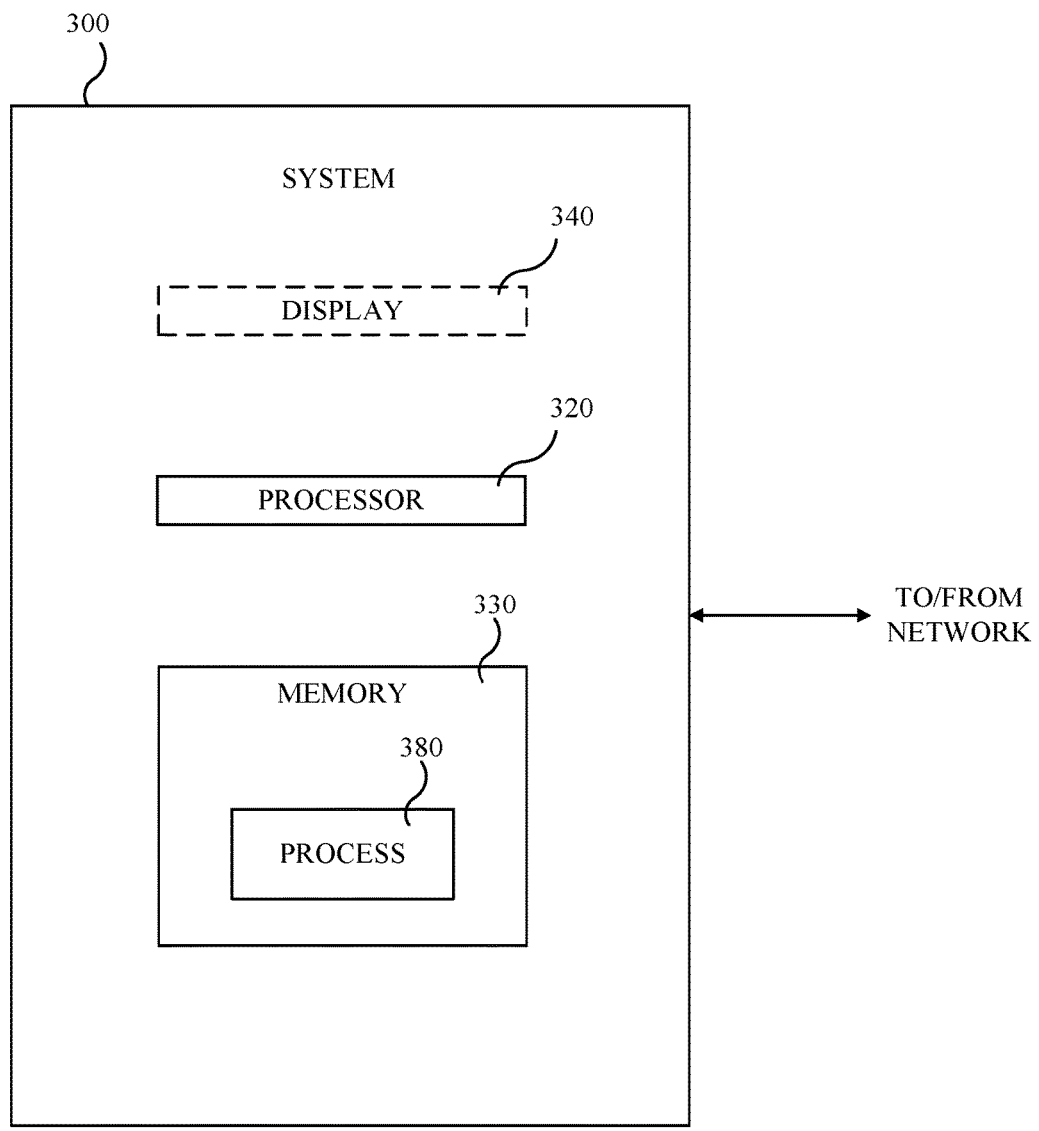
FIG. 3 is a conceptual block diagram of a system that can implement part or all of one or more aspects or processes of systems within which cards according to embodiments of the present disclosure can operate or within which methods according to embodiments of the present disclosure can be carried out.

FIG. 3 is a block diagram of a system 300 that can implement part or all of one or more aspects or processes of systems within which cards according to embodiments of the present disclosure can operate or within which methods according to embodiments of the present disclosure can be carried out. As shown in FIG. 3, memory 330 configures the processor 320 to implement one or more aspects of the methods, steps, and functions disclosed herein (collectively, shown as process 380 in FIG. 3). Different method steps can be performed by different processors. The memory 330 could be distributed or local and the processor 320 could be distributed or singular. The memory 330 could be implemented as an electrical, magnetic or optical memory, or any combination of these or other types of storage devices (including memory portions as described above with respect to cards 202, 212). It should be noted that if distributed processors are employed, each distributed processor that makes up processor 320 generally contains its own addressable memory space. It should also be noted that some or all of computer system 300 can be incorporated into an application-specific or general-use integrated circuit. For example, one or more method steps could be implemented in hardware in an ASIC rather than using firmware. Display 340 is representative of a variety of possible input/output devices (e.g., displays, mice, keyboards, and so on).

Figure 4A:
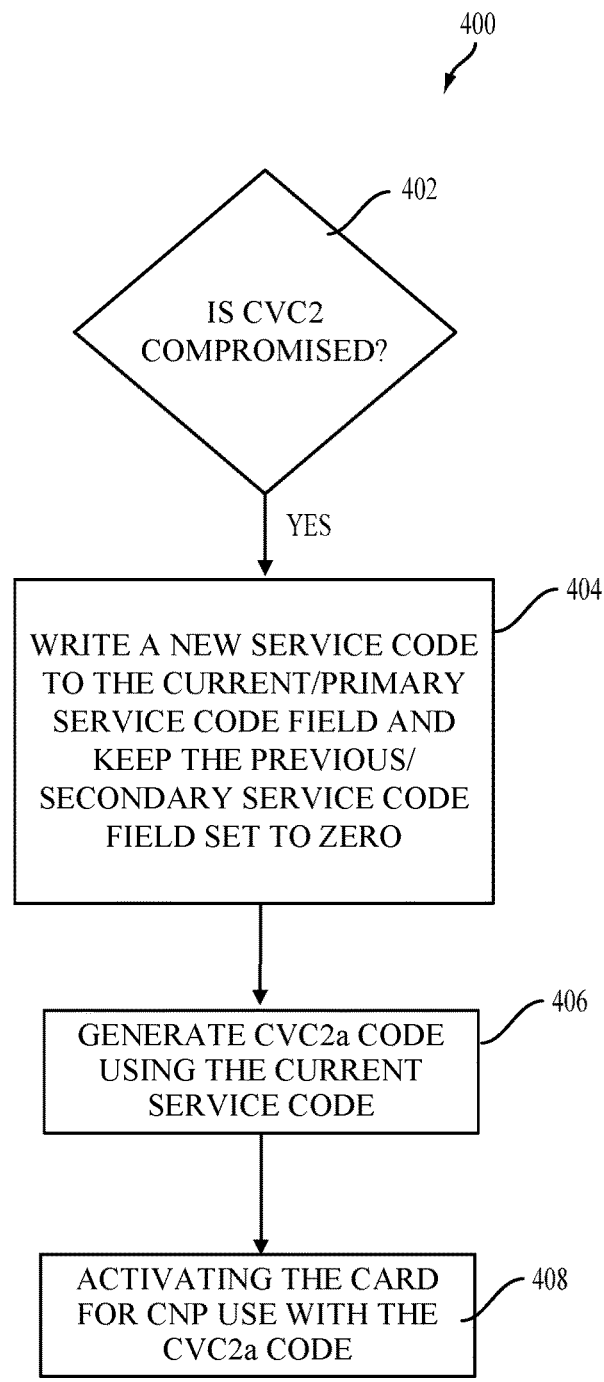
FIG. 4A is a process flow diagram illustrating a method for verifying a payment card according to aspects of the present disclosure.

FIG. 4A is a process flow diagram describing a method 400 for verifying a payment card according to aspects of the present disclosure. At block 402, the method includes determining whether the card's CVC2 code has been compromised. When the service code has been compromised, the method includes writing a new service code to the current/primary service code field and keeping the previous/secondary service code field set to zero at block 404. At block 406, the method includes generating a CVC2a code using the current service code that is stored in the current/primary service code field. At block 408, the method includes activating the card for CNP use with the CVC2a code.

Figure 4B:
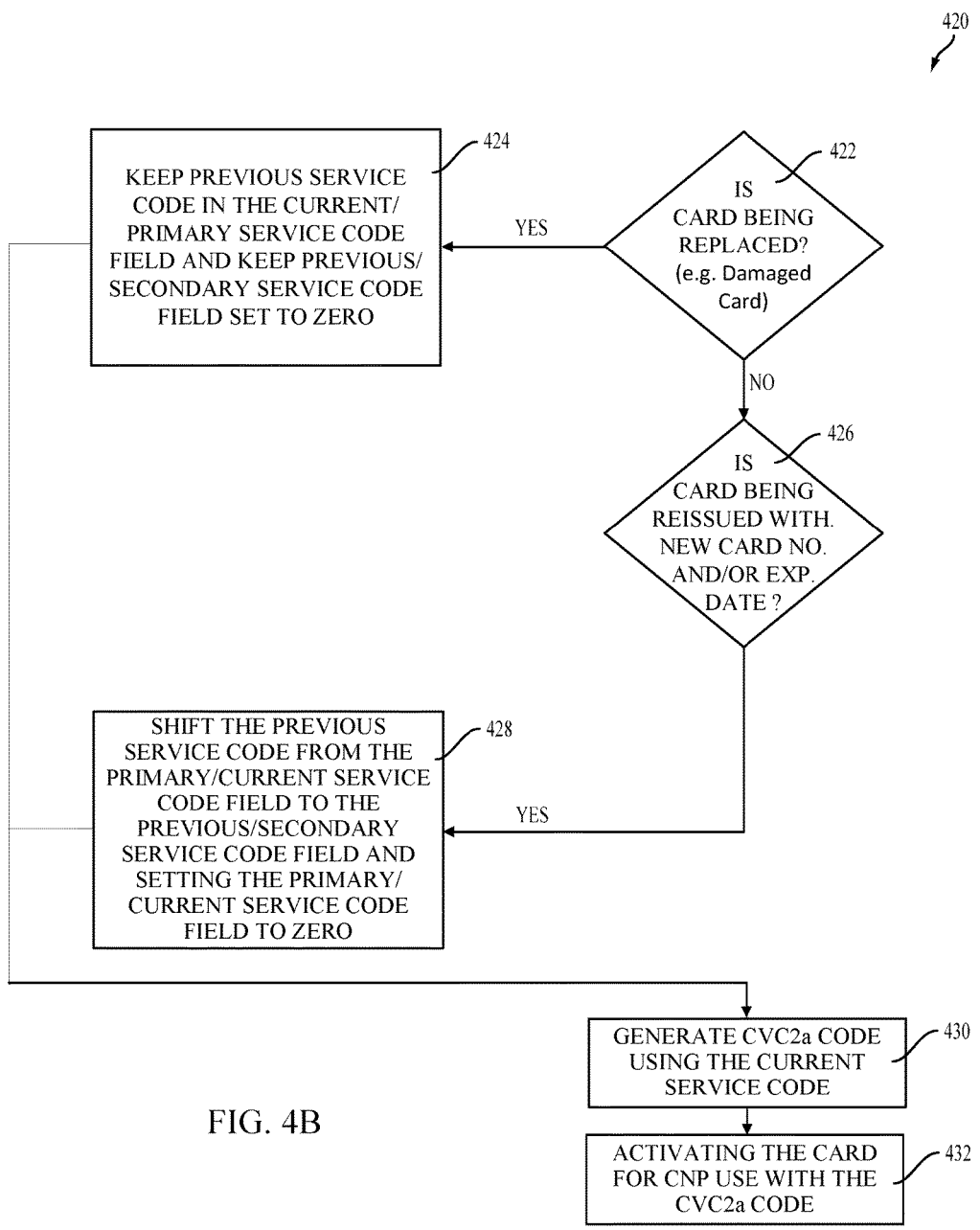
FIG. 4B is a process flow diagram illustrating a method for verifying a replacement or reissued payment card according to aspects of the present disclosure.

FIG. 4B is a process flow diagram describing a method 420 for verifying a replacement or reissued payment card according to aspects of the present disclosure. At block 422, the method includes determining whether the card is being replaced. In the case of a card being replaced, for example if the original card is damaged, neither the card number or expiration date of the card is being changed. When the card is being replaced, the method includes writing a new service code to the current/primary service code field and keeping the previous/secondary service code field set to zero at block 424. When the card is not being replaced, the method includes determining whether the card is being reissued at block 426.

When the card is being reissued, the method includes shifting the previous service code from the primary/current service code field to the previous/secondary service code field and setting the primary/current service code field to zero at block 428. At block 430, the method includes generating a CVC2a code using the current service code, which is stored in the current/primary service code field. At block 432, the method includes activating the card for CNP use with the CVC2a code.

Figure 5A:
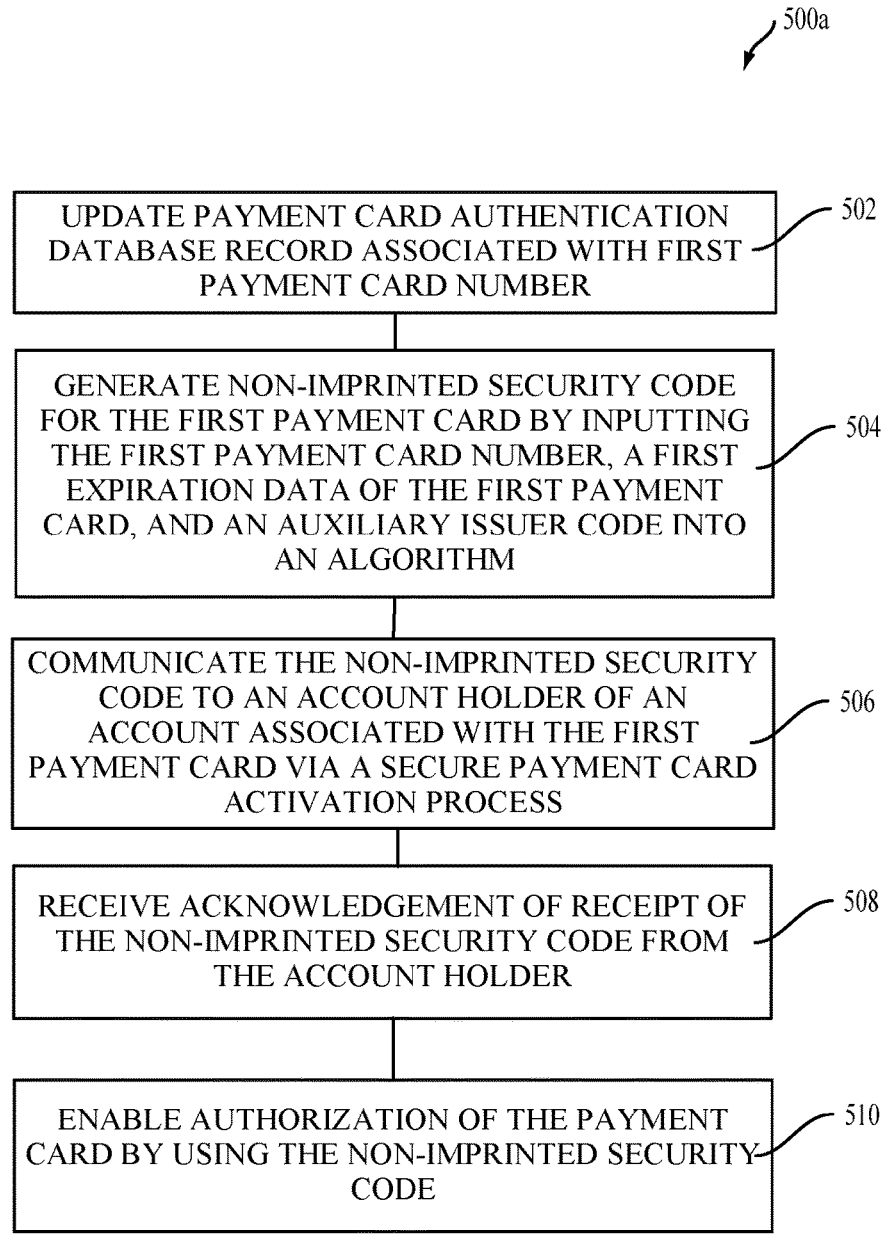
FIGS. 5A through 5C are process flow diagrams illustrating a method for replacing a first imprinted security code of a first payment card without necessarily generating a replacement payment card according to aspects of the present disclosure.
Figure 5B:
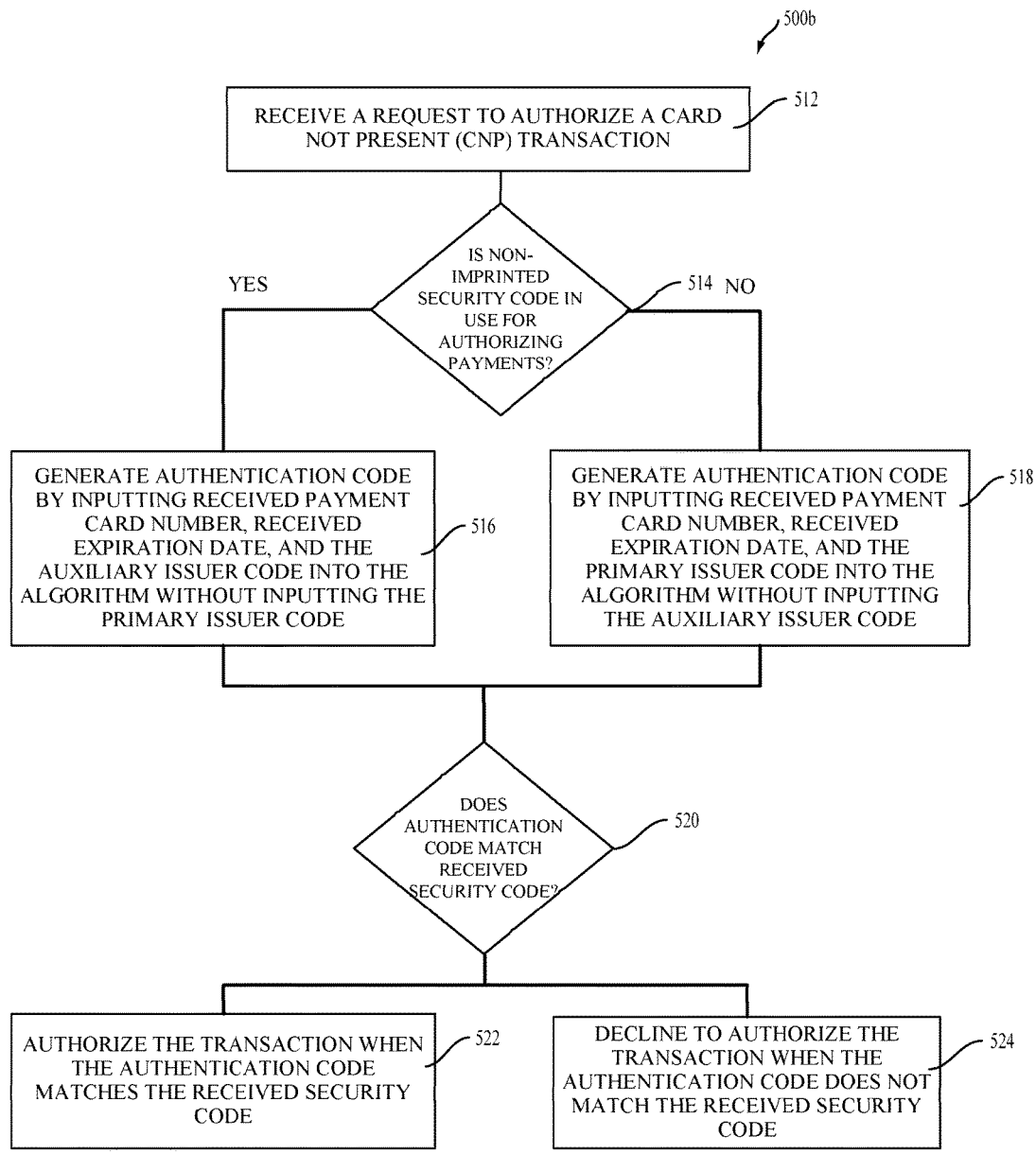
Figure 5C:
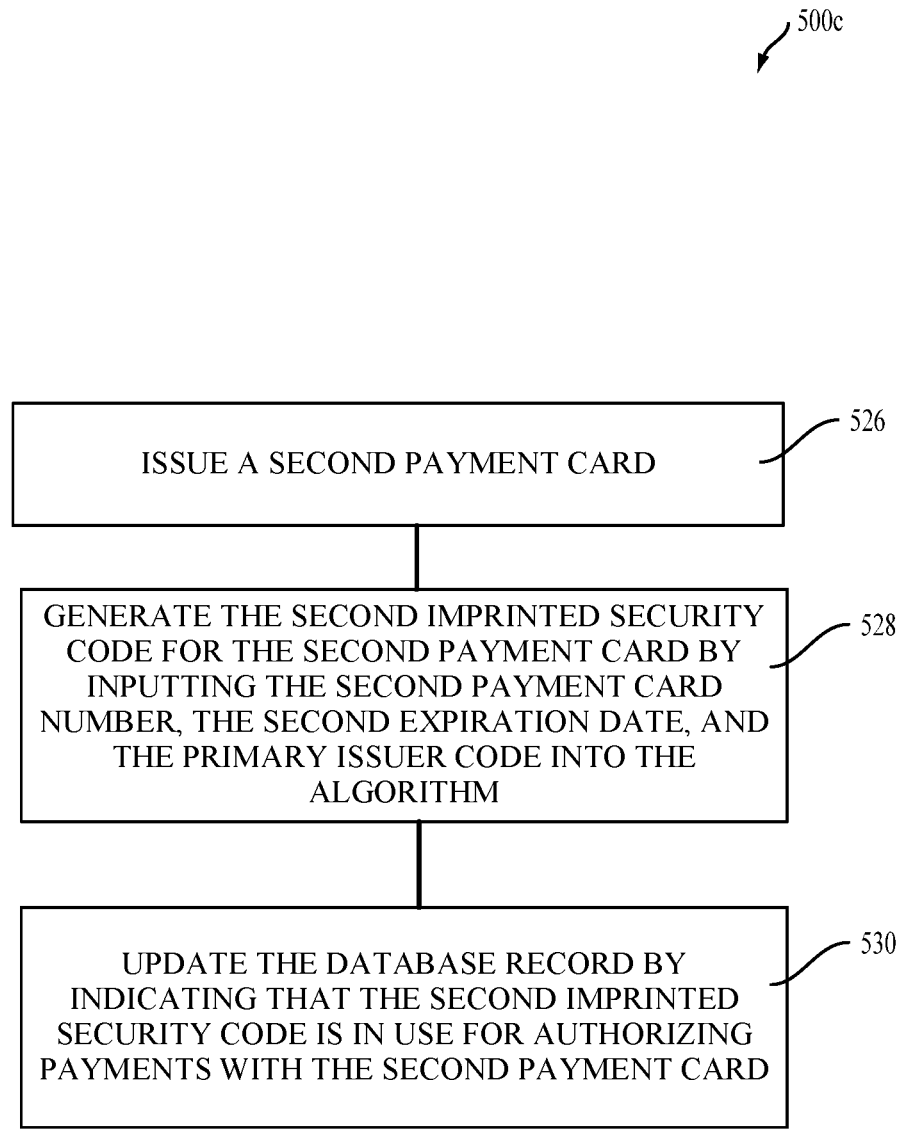

FIGS. 5A through 5C illustrate a method 500a, 500b, 500c for replacing a first imprinted security code of a first payment card without necessarily generating a replacement payment card. At block 502 a payment card authentication database record associated with a first payment card number is updated by including in the database record an indicator that a non-imprinted security code is in use for authorizing payments with the first payment card. At block 504 the non-imprinted security code for the first payment card is generated by inputting the first payment card number of the first payment card, a first expiration date of the first payment card, and an auxiliary issuer code into an algorithm. The auxiliary issuer code is input into the algorithm in place of a primary issuer code that may otherwise be input into the algorithm to generate the first imprinted security code, which may be a CVC2 code. At block 506 the non-imprinted security code is communicated to an account holder of an account associated with the first payment card via a secure payment card activation process. At block 508 acknowledgement of receipt of the non-imprinted security code is received from the account holder. At block 510, in response to receiving the acknowledgement, authorization of the payment card is enabled by using the non-imprinted security code.

At block 512 a request to authorize a card not present ("CNP") transaction is received. The request includes a received payment card number, a received expiration date, and a received security code. At decision point 514, in response to receiving the request, it is determined whether a non-imprinted security code is in use for authorizing payments using the received payment card number. This involves accessing a payment card authorization database associated with the received payment card number. At block 516, in response to determining that a non-imprinted security code is in use for authorizing payments using the received payment card number, an authentication code is generated by inputting the received payment card number, the received expiration date, and the auxiliary issuer code into the algorithm, without inputting the primary issuer code. At block 518, in response to determining that a non-imprinted security code is not in use for authorizing payments using the received payment card number, the authentication code is generated by inputting the received payment card number, the received expiration date, and the primary issuer code into the algorithm, without inputting the auxiliary issuer code. At block 520 the authentication code is compared to the received security code. At block 522 the transaction is authorized when the authentication code matches the received security code. At block 524 authorization of the transaction is declined when the authentication code does not match the received security code.

At block 526 a second payment card, including a second card number, a second expiration date, and a second imprinted security code, is issued. At block 528 the second imprinted security code is generated for the second payment card by inputting the second payment card number, the second expiration date, and the primary issuer code into the algorithm. At block 530 the database record is updated by indicating that the second imprinted security code is in use for authorizing payments with the second payment card.

According to an aspect of the present disclosure, a system of machines are configured for replacing a first imprinted security code of a first payment card without necessarily generating a replacement payment card when the first imprinted security code is compromised. The first imprinted security code may be a CVC2 code. The system includes a payment card data storage machine coupled/in communication with a payment card network and a payment card processor coupled/in communication with the payment card data storage machine. The payment card processor updates a payment card authentication database record, associated with a first payment card number, on the payment card data storage machine. This is performed by including in the database record an indicator that a non-imprinted security code is in use for authorizing payments with the first payment card. The payment card processor also generates the non-imprinted security code for the first payment card by inputting the payment card number of the first payment card, an expiration date of the first payment card, and an auxiliary issuer code into an algorithm. The auxiliary issuer code is input into the algorithm in place of a primary issuer code that may otherwise be input into the algorithm to generate the first imprinted security code.

Moreover, the payment card processor may communicate the non-imprinted security code to an account holder of an account associated with the first payment card via a secure payment card activation process. The payment card processor may also receive acknowledgment of receipt of the non-imprinted security code from the account holder. In response to receiving the acknowledgement, the payment card processor may enable authorization of the payment card by using the non-imprinted security code.

Additionally, the payment card processor may receive a request to authorize a transaction. The request includes a received payment card number, a received expiration date, and a received security code. In response to receiving the request, the payment card processor may determine whether a non-imprinted security code is in use for authorizing payments using the received payment card number. This may include the payment card processor accessing a payment card authentication database record associated with the received payment card number in the payment card data storage machine. In response to determining that a non-imprinted security code is in use for authorizing payments using the received payment card number, the payment card processor may generate an authentication code by inputting the received payment card number, the received expiration date, and the auxiliary issuer code into the algorithm, without inputting the primary issuer code. To the contrary, in response to determining that a non-imprinted security code is not in use for authorizing payments using the received payment card number, the payment card processor may generate the authentication code by inputting the received payment card number, the received expiration date, and the primary issuer code into the algorithm, without inputting the auxiliary issuer code. Moreover, the payment card processor may compare the authentication code to the received security code and either authorize the transaction when the authentication code matches the received security code, or decline to authorize the transaction when the authentication code does not match the received security code.

Furthermore, the payment card processor may issue a second payment card to replace the first payment card. The second payment card includes a second card number, a second expiration date, and a second imprinted security code. The payment card processor may also generate the second imprinted security code for the second payment card by inputting the second payment card number, the second expiration date, and the primary issuer code into the algorithm. Moreover, the payment card processor may update the database record by indicating that the second imprinted security code is in use for authorizing payments with the second payment card.

As is known in the art, part or all of one or more aspects of methods and apparatuses may be distributed as an article of manufacture that itself comprises a computer readable medium having computer readable code means embodied thereon. The computer readable program code means is operable, in conjunction with a computer system, to carry out all or some of the steps to perform the methods or create the apparatuses. A computer usable medium may be a tangible computer-readable recordable storage medium (e.g., floppy disks, hard drives, compact disks, EEPROMs, or memory cards; not including a transmission medium or disembodied signal) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). For example, one device could be a physical memory media associated with a terminal and another device could be a physical memory media associated with a processing center.

The computer systems and servers described herein each contain a memory that will configure associated processors to implement methods, steps, and functions. Such methods, steps, and functions can be carried out, e.g., by processing capability on various system elements or by any combination of elements. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or aspects of a system can include a computer program comprising computer program code means adapted to perform one or more steps when such program is run on a computer, and that such program may be embodied on a tangible computer readable recordable storage medium; for example, in the form of distinct software modules which then execute on one or more hardware processors. Further, a system can include a computer comprising code adapted to cause the computer to carry out one or more steps, together with one or more apparatus elements or features.

Computers discussed herein can be interconnected, for example, by one or more of network, another virtual private network (VPN), the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, and the like (an exemplary and non-limiting list), and can also make use of, for example, Extensible Markup Language (XML), known application programs such as relational database applications, spreadsheets, and the like. The computers can be programmed to implement the logic described.

As described herein a network may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations.

In fact, in various embodiments, the embodiments are directed toward one or more computer systems capable of carrying out the functionality described herein. The computer system includes one or more processors. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer systems can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, software may be implemented in hardware components such as application specific integrated circuits (ASICs). Implementation of the hardware state machine so as to perform the functions described herein will be apparent to persons skilled in the relevant art(s).

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In various embodiments, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In various embodiments, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, AJAX, WSDL and UDDI. Web services methods are well known in the art, and are covered in many standard texts.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Although illustrative embodiments of the present disclosure have been described herein with reference to the accompanying drawings, it is to be understood that the present disclosure is not limited to those precise embodiments, and that various other changes and modifications may be made by one skilled in the art without departing from the scope or spirit of the disclosure.

What is claimed is:

1. A method for replacing a first imprinted security code of a first payment card without generating a replacement payment card, the method comprising:
   updating a payment card authentication database record associated with a first payment card number of a first payment card by including in the database record an indicator that a non-imprinted security code of the first payment card is in use for authorizing payments with the first payment card;
   generating the non-imprinted security code for the first payment card by inputting the first payment card number, a first expiration date of the first payment card, and an auxiliary issuer code into an algorithm, wherein the auxiliary issuer code is input to the algorithm in place of a primary issuer code that may otherwise be input to the algorithm to generate the first imprinted security code;
   receiving a request to authorize a transaction;
   generating the non-imprinted security code as an authentication code, in response to determining that the first imprinted security code is compromised; and
   generating the first imprinted security code as the authentication code, in response to determining that the first imprinted security code is not compromised.

2. The method of claim 1, comprising:
   communicating the non-imprinted security code to an account holder of an account associated with the first payment card via a secure payment card activation process;
   receiving acknowledgement of receipt of the non-imprinted security code from the account holder; and
   in response to receiving the acknowledgement, enabling authorization of the payment card by using the non-imprinted security code.

3. The method of claim 1, comprising:
receiving a request to authorize a transaction, the request including a received payment card number, a received expiration date and a received security code;
in response to receiving the request, determining whether a non-imprinted security code is in use for authorizing payments using the received payment card number by accessing a payment card authentication database record associated with the received payment card number;
in response to determining that a non-imprinted security code is in use for authorizing payments using the received payment card number, generating the authentication code by inputting the received payment card number, the received expiration date, and the auxiliary issuer code into the algorithm without inputting the primary issuer code;
in response to determining that a non-imprinted security code is not in use for authorizing payments using the received payment card number, generating the authentication code by inputting the received payment card number, the received expiration date, and the primary issuer code into the algorithm without inputting the auxiliary issuer code;
comparing the authentication code to the received security code;
authorizing the transaction when the authentication code matches the received security code; and
declining to authorize the transaction when the authentication code does not match the received security code.

4. The method of claim 3, comprising:
receiving a request to authorize a transaction, the request including a received payment card number and a received expiration date;
determining that the transaction is a card present transaction;
authorizing the card present transaction without necessarily receiving the first imprinted security or the non-imprinted security code.

5. The method of claim 1, comprising:
issuing a second payment card to replace the first payment card, the second payment card including a second card number a second expiration date and a second imprinted security code;
generating the second imprinted security code for the second payment card by inputting the second payment card number, the second expiration date, and the primary issuer code into the algorithm; and
updating the database record by indicating that the second imprinted security code is in use for authorizing payments with the second payment card.

6. The method of claim 1, wherein the first imprinted security code comprises a CVC2 code.

7. A system of machines configured for replacing a first imprinted security code of a first payment card without generating a replacement payment card when the first imprinted security code is compromised, the system comprising:
a payment card data storage machine coupled in communication with a payment card network; and
a payment card processor coupled in communication with the payment card data storage machine, the payment card processor being configured to:
update a payment card authentication database record associated with a first payment card number of a first payment card on the payment card data storage machine by including in the database record an indicator that a non-imprinted security code of the first payment card is in use for authorizing payments with the first payment card;
generate the non-imprinted security code for the first payment card by inputting the first payment card number, a first expiration date of the first payment card, and an auxiliary issuer code into an algorithm, wherein the auxiliary issuer code is input to the algorithm in place of a primary issuer code that may otherwise be input to the algorithm to generate the first imprinted security code;
receive a request to authorize a transaction;
generate the non-imprinted security code as an authentication code, in response to determining that the first imprinted security code is compromised; and
generate the first imprinted security code as the authentication code, in response to determining that the first imprinted security code is not compromised.

8. The system of claim 7, wherein the payment card processor is further configured to: communicate the non-imprinted security code to an account holder of an account associated with the first payment card via a secure payment card activation process;
receive acknowledgement of receipt of the non-imprinted security code from the account holder; and
in response to receiving the acknowledgement, enable authorization of the payment card by using the non-imprinted security code.

9. The system of claim 7, wherein the payment card processor is further configured to: receive a request to authorize a transaction, the request including a received payment card number, a received expiration date and a received security code;
in response to receiving the request, determine whether a non-imprinted security code is in use for authorizing payments using the received payment card number by accessing a payment card authentication database record associated with the received payment card number in the payment card data storage machine;
in response to determining that a non-imprinted security code is in use for authorizing payments using the received payment card number, generate the authentication code by inputting the received payment card number, the received expiration date, and the auxiliary issuer code into the algorithm without inputting the primary issuer code;
in response to determining that a non-imprinted security code is not in use for authorizing payments using the received payment card number, generate the authentication code by inputting the received payment card number, the received expiration date, and the primary issuer code into the algorithm without inputting the auxiliary issuer code;
compare the authentication code to the received security code;
authorize the transaction when the authentication code matches the received security code; and
decline to authorize the transaction when the authentication code does not match the received security code.

10. The system of claim 7, wherein the payment card processor is further configured to:
receive a request to authorize a transaction, the request including a received payment card number and a received expiration date;
determine that the transaction is a card present transaction;

authorize the card present transaction without necessarily receiving the first imprinted security or the non-imprinted security code.

11. The system of claim 7, wherein the payment card processor is further configured to:
issue a second payment card to replace the first payment card, the second payment card including a second card number a second expiration date and a second imprinted security code;
generate the second imprinted security code for the second payment card by inputting the second payment card number, the second expiration date, and the primary issuer code into the algorithm; and
update the database record by indicating that the second imprinted security code is in use for authorizing payments with the second payment card.

12. The system of claim 7, wherein the first imprinted security code comprises a CVC2 code.

13. A method for activating a payment card, comprising:
determining whether a CVC2 code of a payment card has been compromised;
in response to determining that the CVC2 code has been compromised, writing an auxiliary service code of the payment card to a current/primary service code field in a payment card database; and
in response to determining that the payment card is being reissued:
shifting the auxiliary service code of the payment card to a previous/secondary service code field in the payment card database; and
writing a primary service code of a reissued payment card to the current/primary service code field.

14. The method of claim 13, comprising restricting use of the card for card-present transactions when the CVC2a code is not received.

15. The method of claim 13, comprising:
in response to determining that the CVC2 code has not been compromised and the payment card is being reissued, shifting the auxiliary service code from the primary/current service code field to the previous/secondary service code field and setting the primary/current service code field to zero.

16. The method of claim 13, comprising:
in response to determining that the CVC2 code has not been compromised and the payment card is being replaced, keeping the auxiliary service code in the current/primary service code field and keeping the previous/secondary service code field set to zero.

17. A method for activating a payment card, comprising:
generating an auxiliary CVC2 code (CVC2a) for a payment card based on service code; and
storing the auxiliary CVC2 code in either a first service code field of a payment card authorization database or a second service code field of the payment card authorization database based on whether the payment card is being reissued.

18. An apparatus for activating a payment card, wherein the apparatus is configured to:
determine whether a CVC2 code of a payment card has been compromised;
write an auxiliary service code of the payment card to a current/primary service code field of a payment card authorization database in the event that the CVC2 code has been compromised;
in response to determining that the payment card is being reissued:
shift the auxiliary service code of the payment card to a previous/secondary service code field of a payment card authorization database; and
write a primary service code of a reissued payment card to the current/primary service code field in the payment card database.

19. The apparatus of claim 18, wherein the apparatus is further configured to shift the auxiliary service code from the primary/current service code field to the previous/secondary service code field and setting the primary/current service code field to the initial value in the event that the payment card has not been compromised and the payment card is being reissued.

20. The apparatus of claim 18, wherein the apparatus is further configured to keep the auxiliary service code in the current/primary service code field and keeping the previous/secondary service code field set to the initial value in the event that the payment card has not been compromised and is being replaced.

* * * * *